United States Patent
Okumura (10) Patent No.: US 9,874,733 B2
(45) Date of Patent: Jan. 23, 2018

(54) ZOOM LENS AND IMAGE PICKUP APPARATUS INCLUDING THE SAME

(71) Applicant: CANON KABUSHIKI KAISHA, Tokyo (JP)

(72) Inventor: Tetsuichiro Okumura, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 2 days.

(21) Appl. No.: 15/226,210

(22) Filed: Aug. 2, 2016

(65) Prior Publication Data

US 2017/0045720 A1    Feb. 16, 2017

(30) Foreign Application Priority Data

Aug. 10, 2015  (JP) ................................. 2015-158016

(51) Int. Cl.
  G02B 15/14    (2006.01)
  G02B 15/177   (2006.01)
  G02B 27/00    (2006.01)

(52) U.S. Cl.
  CPC ....... G02B 15/177 (2013.01); G02B 27/0025 (2013.01)

(58) Field of Classification Search
  CPC .................... G02B 15/177; G02B 27/0025
  See application file for complete search history.

(56) References Cited

U.S. PATENT DOCUMENTS 7,382,550 B2    6/2008  Nishimura
7,920,341 B2    4/2011  Shibata et al.
9,253,382 B2 *  2/2016  Okumura ............. G02B 15/173

FOREIGN PATENT DOCUMENTS

JP    2007078834 A    3/2007
JP    2009031358 A    2/2009
JP    2014006275 A    1/2014

* cited by examiner

*Primary Examiner* — Joseph P Martinez
(74) *Attorney, Agent, or Firm* — Rossi, Kimms & McDowell LLP (57) ABSTRACT

A zoom lens includes, in order from an object side to an image side: a first lens unit having a negative refractive power; and a second lens unit having a positive refractive power, the interval between the adjacent lens units varying during zooming. The configuration of the first lens unit, the focal length f1 of the first lens unit, and the back focus Sk at the wide angle end are appropriately set.

14 Claims, 10 Drawing Sheets

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, and is suitable for image pickup optical systems used for image pickup apparatuses, such as a digital camera, a video camera, a TV camera, a monitoring camera, and a silver halide film camera.

Description of the Related Art

A zoom lens that has a wide imaging angle of view and a short total length, and is small in size as a whole and light in weight is demanded as an image pickup optical system used for an image pickup apparatus. Conventionally, a negative-lead type zoom lens where a lens unit having a negative refractive power is disposed closest to the object side has been known as a zoom lens that is small in size over the entire system and has a wide angle of view. Japanese Patent Application Laid-Open No. 2014-006275 discloses a two-unit zoom lens that includes, in order from an object side to an image side: a first lens unit having a negative refractive power; and a second lens unit having a positive refractive power, the zoom lens performing zooming by changing the interval between the lens units.

Japanese Patent Application Laid-Open No. 2007-78834 discloses a three-unit zoom lens and a four-unit zoom lens that include, in order from an object side to an image side: a first lens unit having a negative refractive power; a second lens unit having a positive refractive power; and at least one lens unit, the zoom lens performing zooming by changing the interval between adjacent lens units. Japanese Patent Application Laid-Open No. 2009-031358 discloses a four-unit zoom lens that includes, in order from an object side to an image side: a first lens unit having a negative refractive power; a second lens unit having a positive refractive power; a third lens unit having a negative refractive power; and a fourth lens unit having a positive refractive power, the zoom lens performing zooming by changing the interval between adjacent lens units.

In a negative-lead type zoom lens, a first lens unit disposed closest to the object side tends to be large and heavy in weight. At the first lens unit, the incident height of off-axial rays at a wide angle end is high. Consequently, the first lens unit causes strong various aberrations, such as the field curvature aberration, astigmatism and distortion. For achieving high optical characteristics of a negative-lead type zoom lens while facilitating reduction in size over the entire system and reduction in weight, it is important to set appropriately the lens configuration of the first lens unit.

SUMMARY OF THE INVENTION

A zoom lens of the present invention includes, in order from an object side to an image side: a first lens unit having a negative refractive power; and a second lens unit having a positive refractive power, an interval between adjacent lens units varying during zooming, wherein the first lens unit includes at least three lenses, the first lens unit includes a negative lens G1n that is made of a resin material and has an aspherical-shaped lens surface, and a positive lens G1p that is made of a resin material and has an aspherical-shaped lens surface, and a following conditional expression is satisfied:

$$0.55 < |f1/Sk| < 2.20,$$

where f1 represents a focal length of the first lens unit, and Sk represents a back focus at a wide angle end.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Exemplary embodiments of the present invention are hereinafter described in detail with reference to the accompanying drawings. A zoom lens of the present invention includes, in order from an object side to an image side: a first lens unit having a negative refractive power; and a second lens unit having a positive refractive power, the interval between adjacent lens units varying during zooming. The first lens unit includes at least three lenses. The first lens unit includes a negative lens G1$n$ that is made of a resin material and has an aspherical-shaped lens surface, a positive lens G1$p$ that is made of a resin material and has an aspherical-shaped lens surface.

Figure 1A:
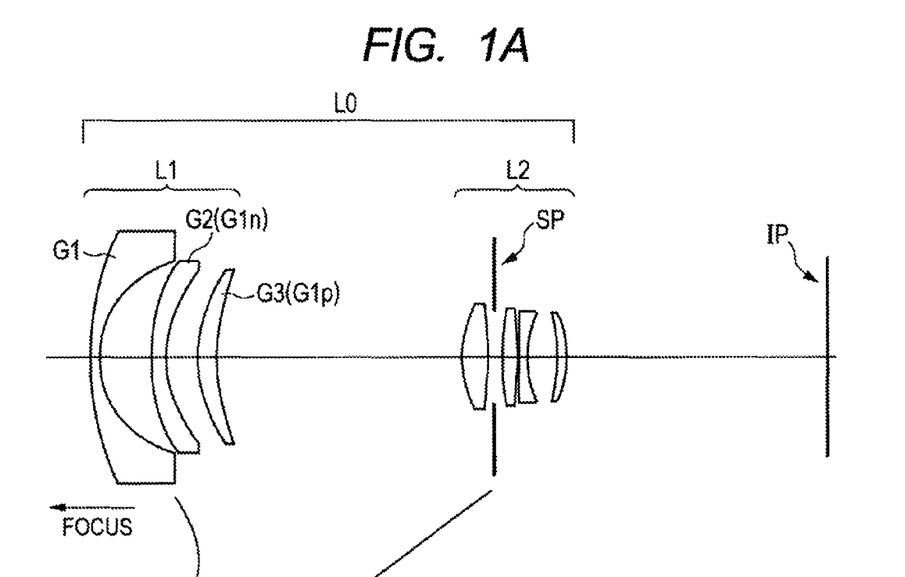
FIG. 1A is a lens sectional view of a zoom lens of Embodiment 1 at a wide angle end according to the present invention.
Figure 1B:
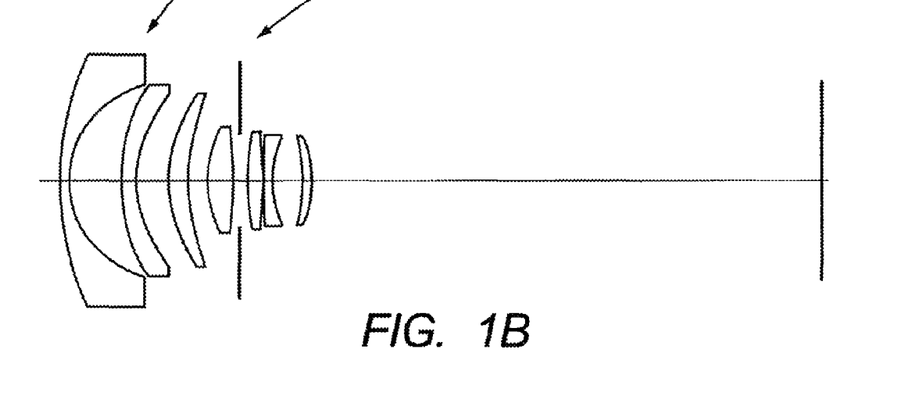
FIG. 1B is a lens sectional view of the zoom lens of Embodiment 1 at a telephoto end according to the present invention.
Figure 2A:
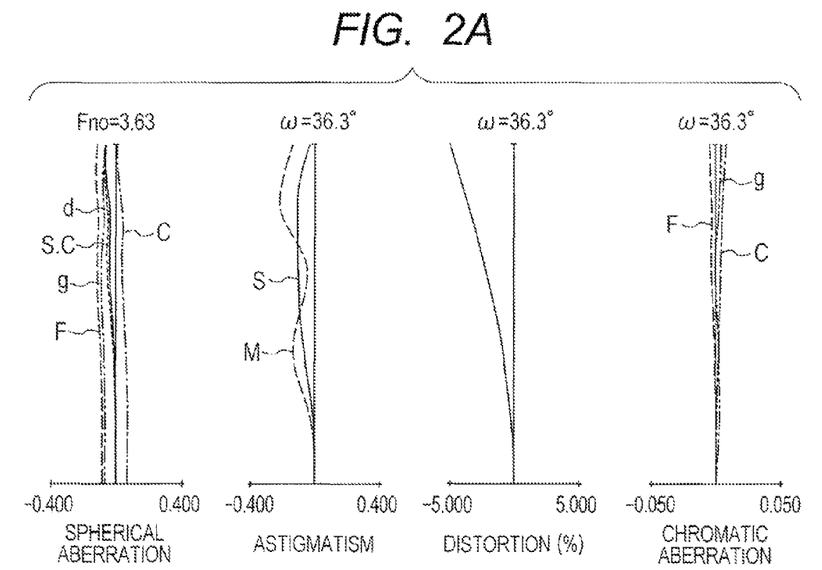
FIG. 2A is a longitudinal aberration diagram of the zoom lens of Embodiment 1 at the wide angle end according to the present invention.
Figure 2B:
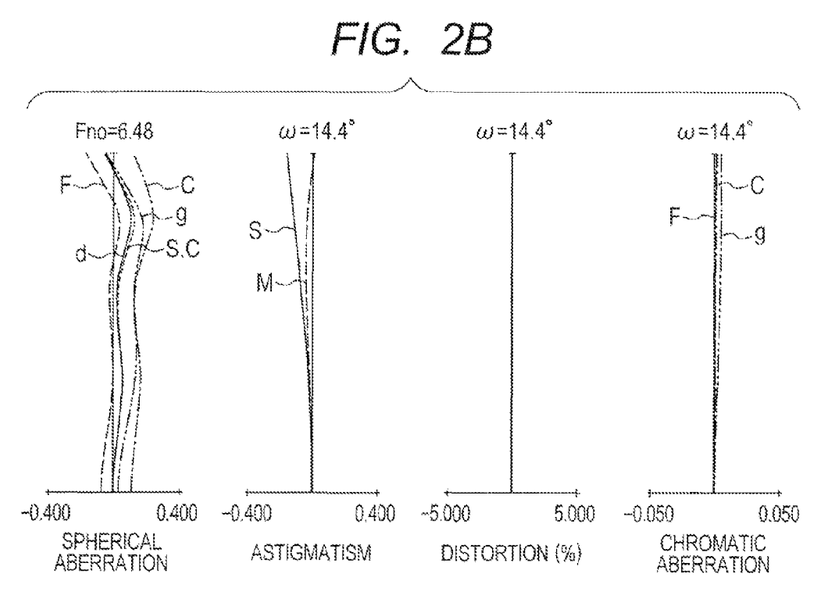
FIG. 2B is a longitudinal aberration diagram of the zoom lens of Embodiment 1 at the telephoto end according to the present invention.

FIGS. 1A and 1B are lens sectional views of the zoom lens of Embodiment 1 of the present invention at the wide angle end (short focal length end) and the telephoto end (long focal length end), respectively. FIGS. 2A and 2B are longitudinal aberration diagrams at the wide angle end and the telephoto end, respectively, when the zoom lens of Embodiment 1 is focused on an infinity object. Embodiment 1 is a zoom lens with a zoom ratio of 2.87, and F-numbers of 3.63 to 6.48.

Figure 3A:
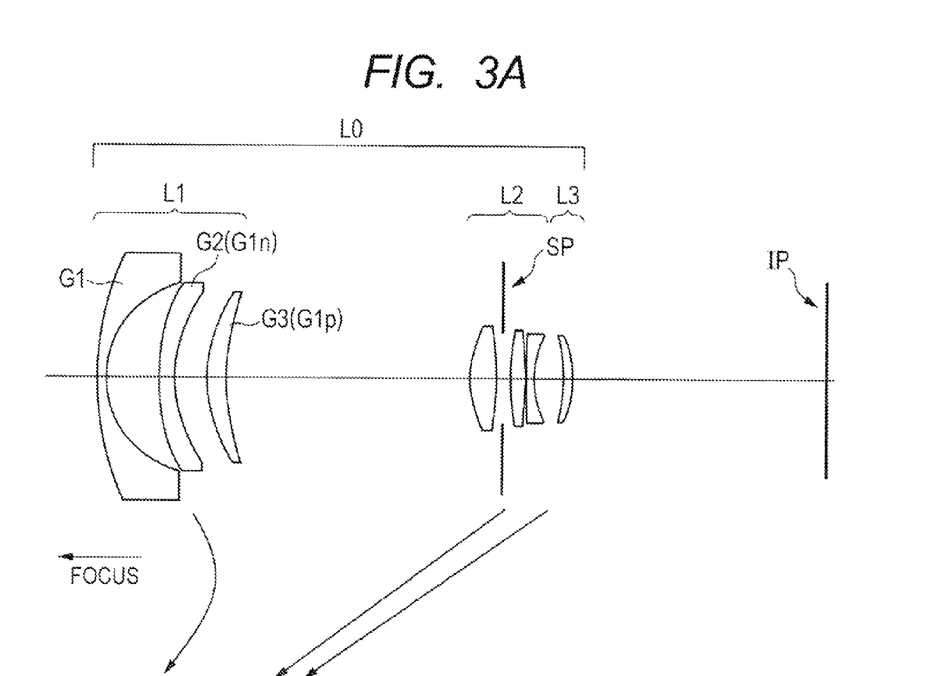
FIG. 3A is a lens sectional view of a zoom lens of Embodiment 2 at a wide angle end according to the present invention.
Figure 3B:
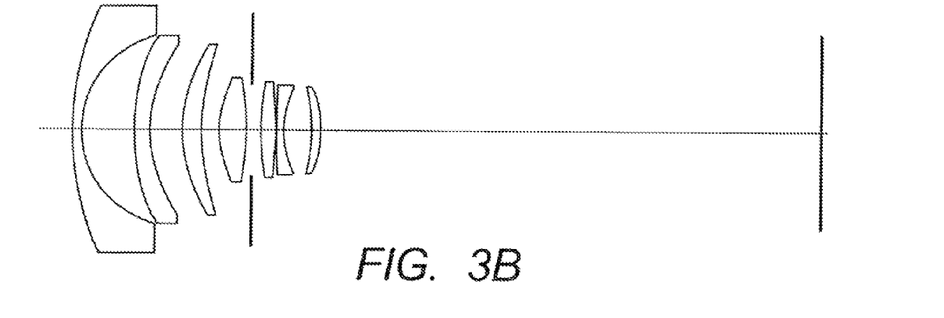
FIG. 3B is a lens sectional view of the zoom lens of Embodiment 2 at a telephoto end according to the present invention.
Figure 4A:
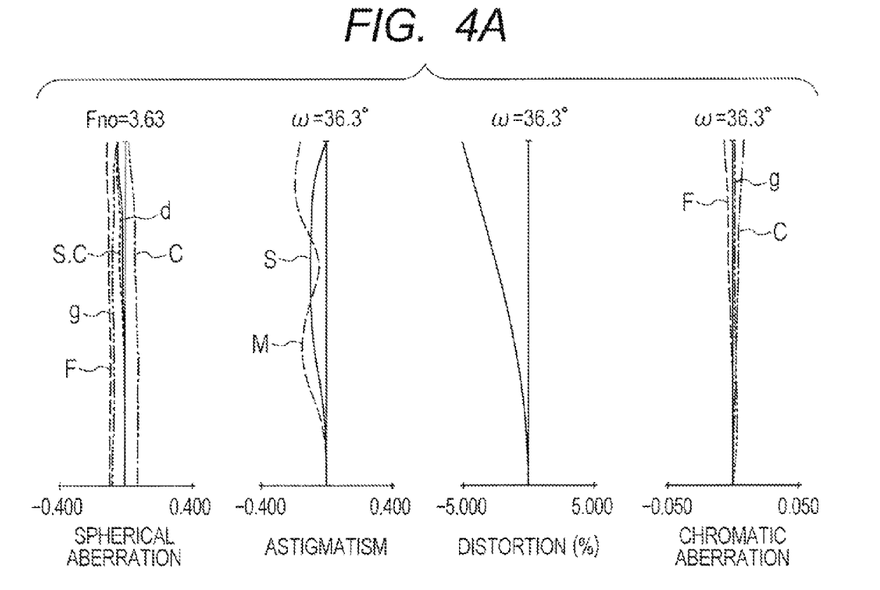
FIG. 4A is a longitudinal aberration diagram of the zoom lens of Embodiment 2 at the wide angle end according to the present invention.
Figure 4B:
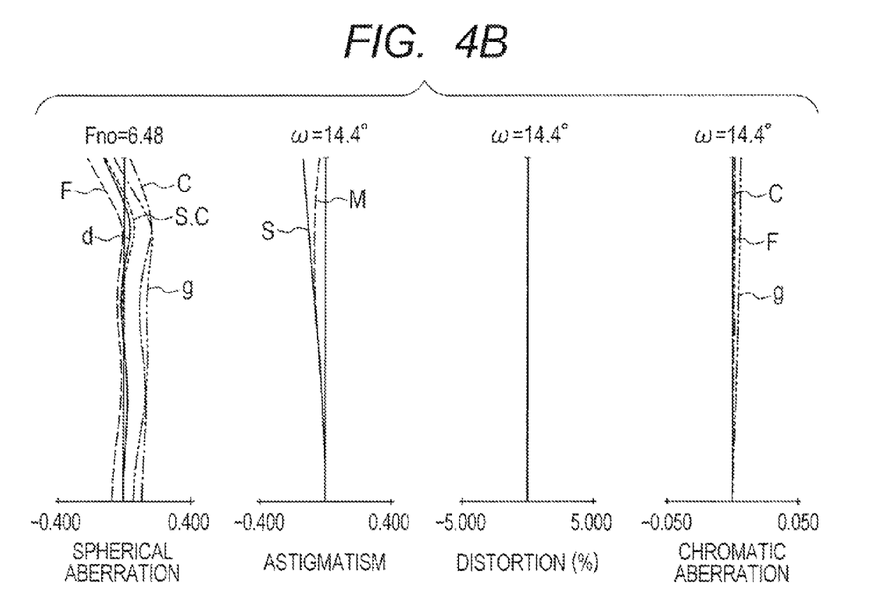
FIG. 4B is a longitudinal aberration diagram of the zoom lens of Embodiment 2 at the telephoto end according to the present invention.

FIGS. 3A and 3B are lens sectional views of a zoom lens of Embodiment 2 at a wide angle end and a telephoto end according to the present invention. FIGS. 4A and 4B are longitudinal aberration diagrams at the wide angle end and the telephoto end, respectively, when the zoom lens of Embodiment 2 is focused on an infinity object. Embodiment 2 is a zoom lens with a zoom ratio of 2.87, and F-numbers of 3.63 to 6.48.

Figure 5A:
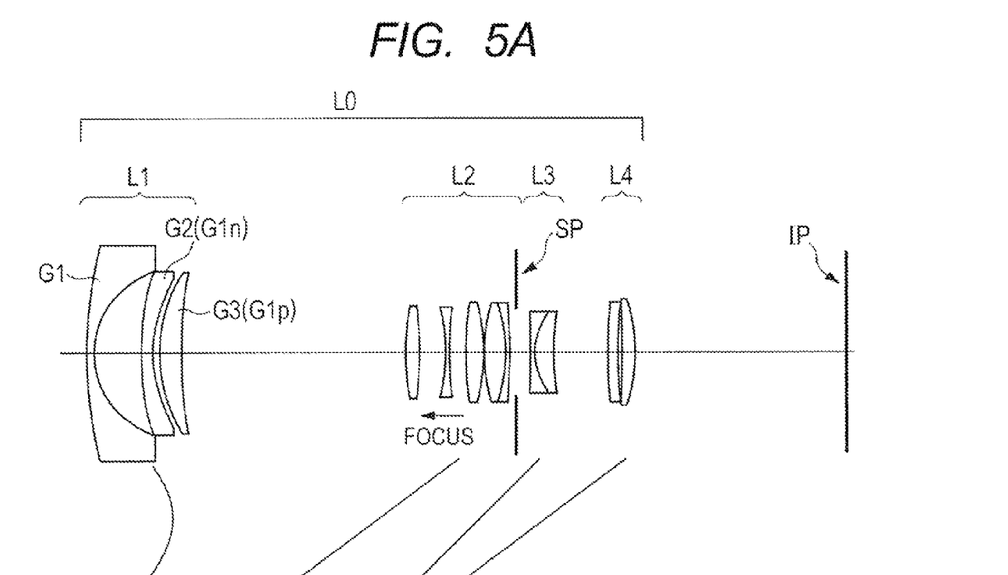
FIG. 5A is a lens sectional view of a zoom lens of Embodiment 3 at a wide angle end according to the present invention.
Figure 5B:
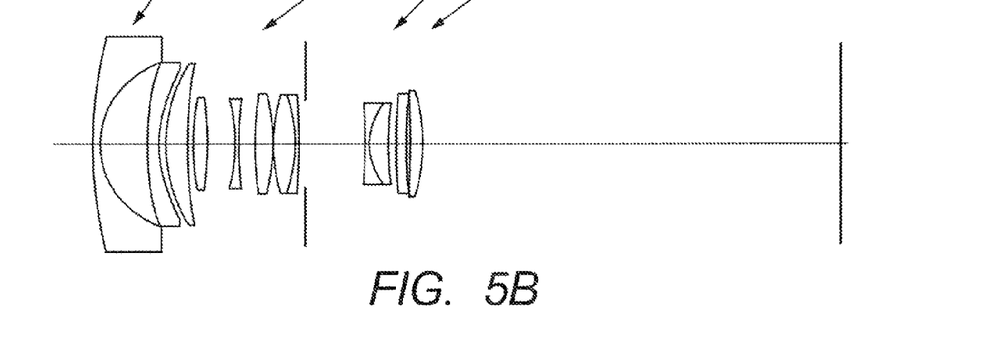
FIG. 5B is a lens sectional view of the zoom lens of Embodiment 3 at a telephoto end according to the present invention.
Figure 6A:
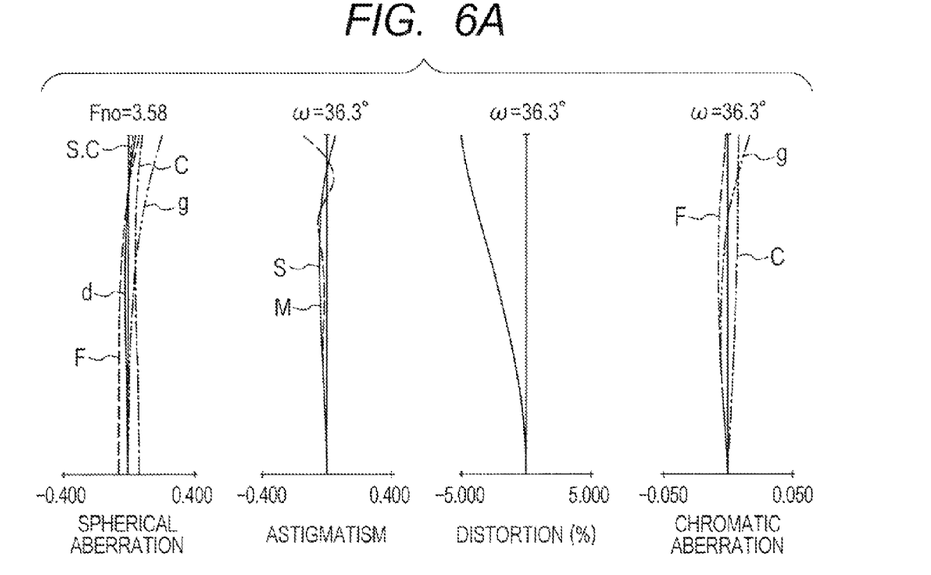
FIG. 6A is a longitudinal aberration diagram of the zoom lens of Embodiment 3 at the wide angle end according to the present invention.
Figure 6B:
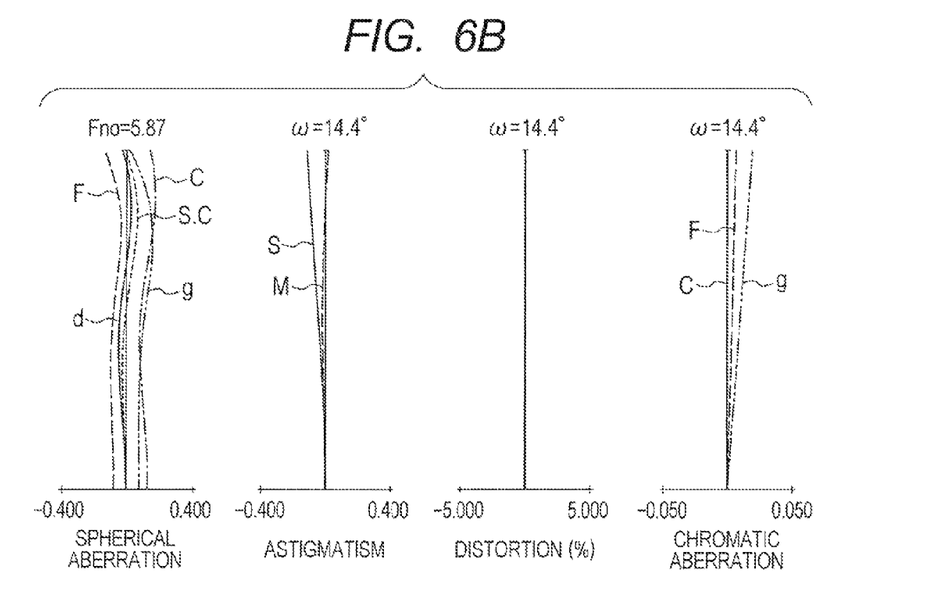
FIG. 6B is a longitudinal aberration diagram of the zoom lens of Embodiment 3 at the telephoto end according to the present invention.

FIGS. 5A and 5B are lens sectional views of a zoom lens of Embodiment 3 at a wide angle end and a telephoto end according to the present invention. FIGS. 6A and 6B are longitudinal aberration diagrams at the wide angle end and the telephoto end, respectively, when the zoom lens of Embodiment 3 is focused on an infinity object. Embodiment 3 is a zoom lens with a zoom ratio of 2.87, and F-numbers of 3.56 to 5.87.

Figure 7A:
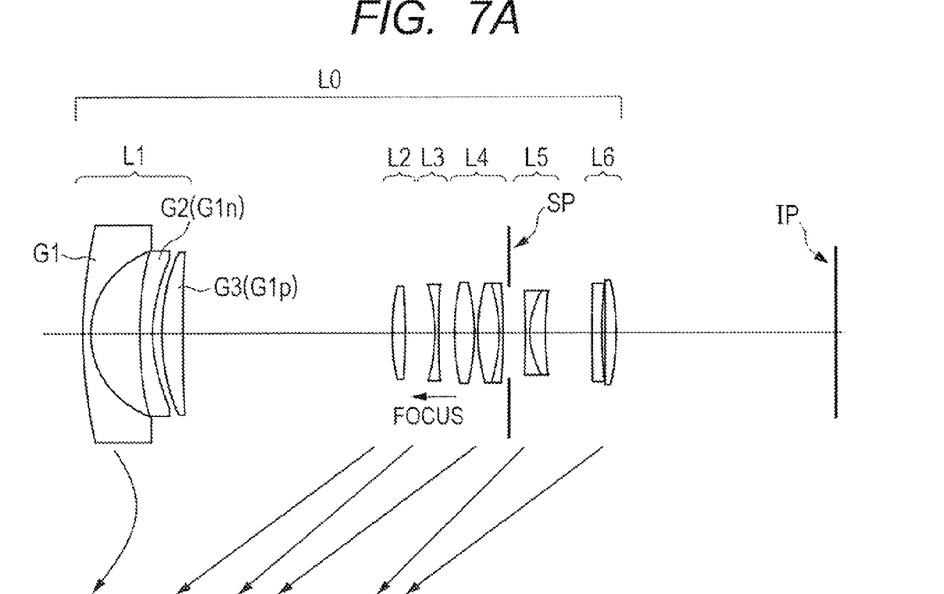
FIG. 7A is a lens sectional view of a zoom lens of Embodiment 4 at a wide angle end according to the present invention.
Figure 7B:
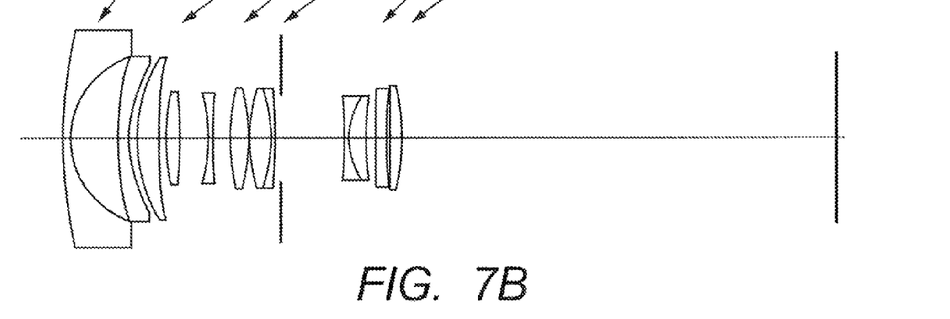
FIG. 7B is a lens sectional view of the zoom lens of Embodiment 4 at a telephoto end according to the present invention.
Figure 8A:
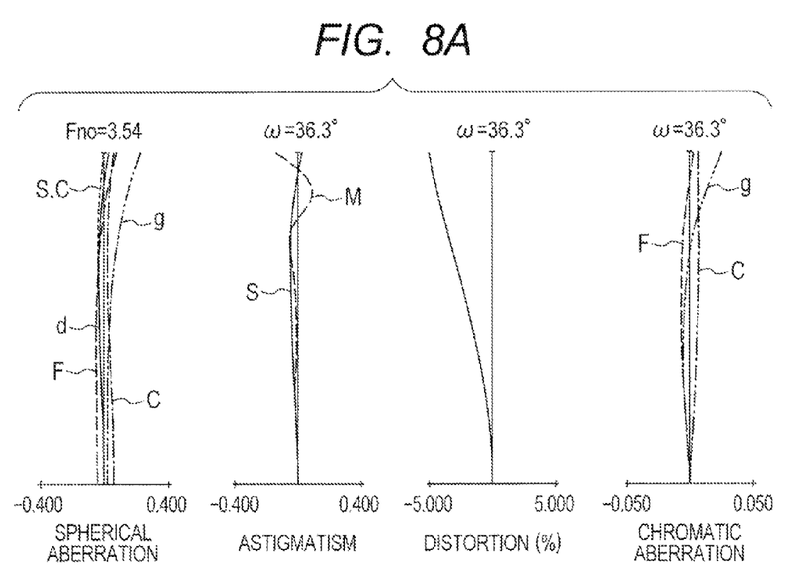
FIG. 8A is a longitudinal aberration diagram of the zoom lens of Embodiment 4 at the wide angle end according to the present invention.
Figure 8B:
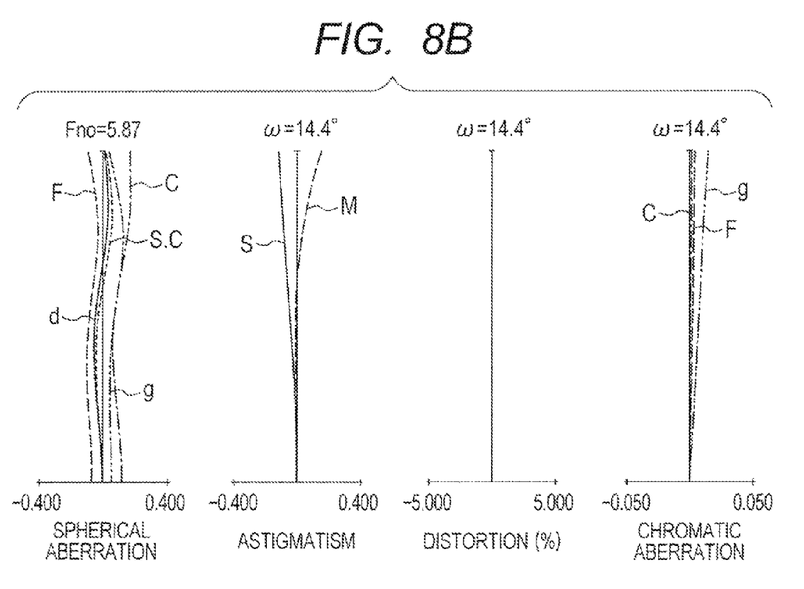
FIG. 8B is a longitudinal aberration diagram of the zoom lens of Embodiment 4 at the telephoto end according to the present invention.
Figure 9:
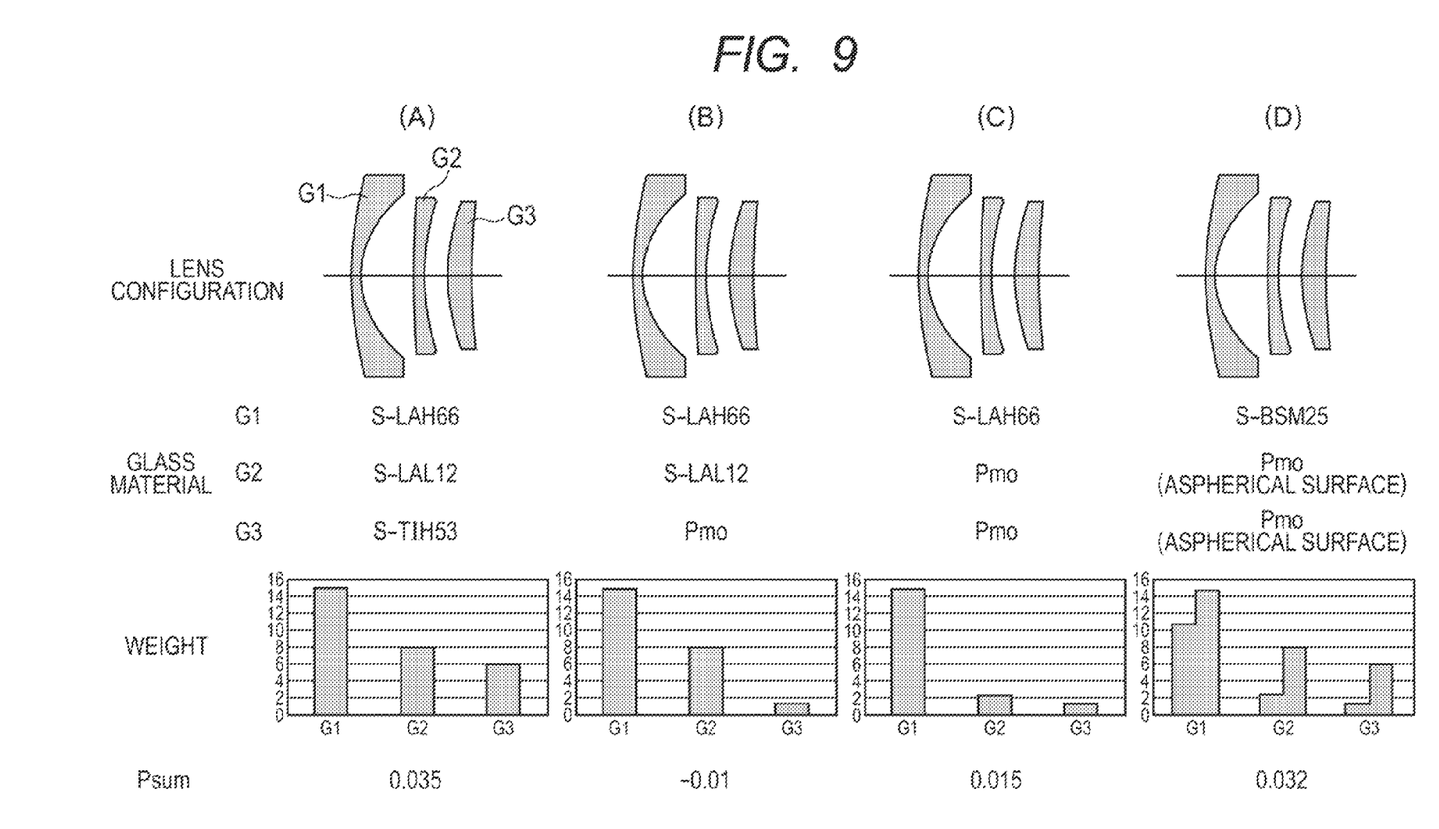
FIG. 9 is a diagram of comparison between the weight and Psum that vary according to a glass material used in a first lens unit L1.
Figure 10:
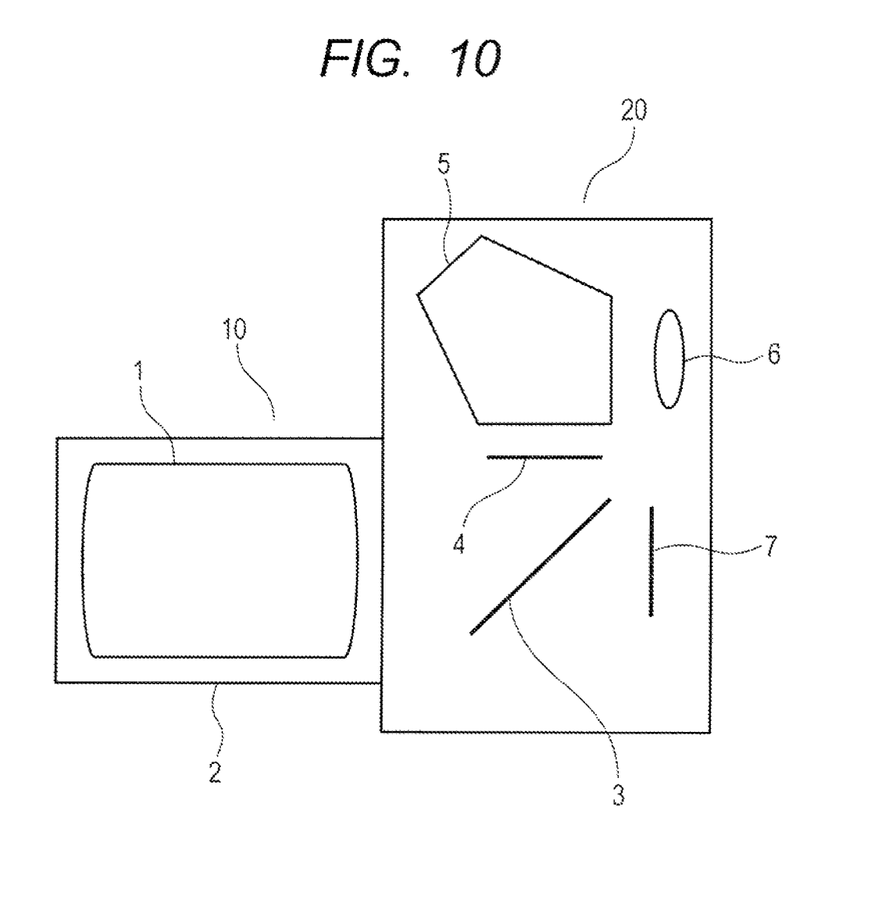
FIG. 10 is a schematic diagram of a main part of an image pickup apparatus that includes the zoom lens according to the present invention.

FIGS. 7A and 7B are lens sectional views of a zoom lens of Embodiment 4 at a wide angle end and a telephoto end according to the present invention. FIGS. 8A and 8B are longitudinal aberration diagrams at the wide angle end and the telephoto end, respectively, when the zoom lens of Embodiment 4 is focused on an infinity object. Embodiment 4 is a zoom lens with a zoom ratio of 2.87, and F-numbers of 3.54 to 5.87. FIG. 9 is a diagram illustrating the lens configuration of a first lens unit of a negative-lead type zoom lens. FIG. 10 is a schematic diagram of a main part of an image pickup apparatus according to the present invention.

The zoom lens of each embodiment is an image pickup optical system (optical system) included in an image pickup apparatus, such as a video camera, a digital camera and a silver halide film camera. In the lens sectional view, the left is the object side (front) and the right is the image side (rear). The zoom lens of each embodiment may be used for a projector. In this case, the left is a screen side, and the right is a projected image side. The lens sectional view illustrates the zoom lens L0. In this view, i indicates the order of a lens unit from the object side, and Li denotes an i-th lens unit.

This view also indicates an aperture stop SP (maximum aperture F-number stop). An image plane IP corresponds to an image pickup plane of a solid-state image pickup element (photo-electric conversion element), such as a CCD sensor or a CMOS sensor, in the case of use as an imaging optical system of a video camera or a digital still camera, and to a film surface in the case of a silver halide film camera. Arrows indicate movement directions during zooming from the wide angle end to the telephoto end. An arrow related to focusing indicates a movement direction during focusing from the infinity to a close range.

The characteristics of the lens configuration of the first lens unit L1 in the zoom lens according to the present invention are described with reference to FIG. 9. FIG. 9 is a diagram illustrating the lens configuration of the first lens unit that is often adopted in a negative lead type (hereinafter, called "N" type) zoom lens. FIG. 9(A) to FIG. 9(D) illustrate the configuration that includes, in order from the object side to the image side: a negative lens G1 having a meniscus shape with a convex surface being oriented toward the object side; a negative lens G2 having a meniscus shape with a convex surface being oriented toward the object side; and a positive lens G3.

Next, the lens configuration is described in view of an aberration theory. In many cases, plastic mold glass (hereinafter, abbreviated as "Pmo") has characteristics that this glass has a lower refractive index (c.a. Nd=1.5 to 1.6) than typical glass and has a low specific gravity. FIG. 9(A) to FIG. 9(D) illustrate the lens configurations of first lens units of typical N-type zoom lenses.

In typical cases, the negative lens G1 and the negative lens G2 are made of glass with a low dispersion and high refractive index to correct the chromatic aberration, field curvature and distortion, and the positive lens G3 is made of glass with a high dispersion and high refractive index. In the case of selecting the materials of the negative lenses G1 and G2 and positive lens G3 as described above, many glass materials with high specific gravities are used. Consequently, the weight of the first lens unit is high. The Petzval sum affecting the field curvature (hereinafter abbreviated as "Psum") Psum=$\Sigma\varphi i/Ni$, where $\varphi i$ denotes the power of an i-th lens in a thin state, and Ni denotes the refractive index of the material. In the case of Psum=0, the state is achieved where the image plane in the thin state has no curvature. However, in actuality, a balance is required to be brought in consideration of aberrations.

In the optical system illustrated in FIG. 9(A), the balance is achieved at Psum=0.035, where the field curvature can be favorably corrected over the zoom lens as a whole. In the case where the glass that is the material of the positive lens G3 is replaced with Pmo as illustrated in FIG. 9(B), the weight of the first lens unit is reduced by an amount of replacement of the material of the positive lens G3 with Pmo. Unfortunately, Psum largely varies, and the field curvature significantly occurs. In addition to replacement of the positive lens G3, in the case where the material of the negative lens G2 that is the glass is also replaced with Pmo as illustrated in FIG. 9(C), the weight of the first lens unit is significantly reduced. It is however difficult to correct sufficiently the field curvature.

In FIG. 9(D), Pmo is adopted as the materials of the negative lens G2 and the positive lens G3, and aspherical surfaces are introduced as the lens surfaces of the negative lens G2 and the positive lens G3. This configuration favorably corrects the field curvature and distortion. Consequently, a burden of correction of the field curvature and distortion for the negative lens G1 decreases, which facilitates reduction in refractive index of the material of the negative lens G1. As a result, Psum in the lens arrangement illustrated in FIG. 9(A) becomes substantially equivalent to Psum in the lens arrangement illustrated in FIG. 9(D). The field curvature can be favorably corrected over the zoom lens as a whole. Since a material with a low refractive index typically tends to have a low specific gravity, a material with a low refractive index is adopted as the material of the negative lens G1 to achieve reduction in weight of the first lens unit.

Because of the reason described above, the N-type zoom lens of the present invention adopts the lens arrangement as illustrated in FIG. 9(D). That is, the first lens unit includes, in order from the object side to the image side: the negative lens G1 that has a meniscus shape with a convex surface being oriented toward the object side; the negative lens G2 that is made of a resin material and has a meniscus shape with a convex surface being oriented toward the object side; and a positive lens G3 made of a resin material.

This configuration facilitates significant reduction in weight while correcting various aberrations (in particular, the field curvature and distortion). Use of a lens made of a resin material typically causes a deviation in focus and aberrations when the temperature varies.

To address this characteristics, the present invention adopts Pmo as the materials of the positive lens and the negative lens included in the same lens unit, thereby achieving a configuration with a small deviation in focus and aberration due to variation in environment, such as variation in temperature. Furthermore, the lens configuration of the first lens unit includes, in order from the object side to the image side: the lens made of a glass material; the lens made of Pmo; and the lens made of Pmo. This configuration prevents the resin material from being directly touched, and avoids flaws on the lens surface.

S-LAH66, S-BSM25, S-LAL12 and S-TIH53, which are glass materials listed in FIG. 9, are trade names of Ohara Inc.

To achieve further favorable optical characteristics, the first lens unit L1 may include not only the negative lens G1, the negative lens G2 and the positive lens G3, but also at least one lens on the image side of the positive lens G3. The first lens unit L1 may thus include three or more lenses.

In the zoom lens of the present invention, the first lens unit L1 has a focal length f1, and a back focus Sk at the wide angle end. In this case, the following conditional expression is satisfied:

$$0.55 < |f1/Sk| < 2.20 \quad (1)$$

Next, the technical meaning of the conditional expression is described.

The conditional expression (1) defines the ratio of the focal length and the back focus at the wide angle end of the first lens unit L1. In the case where the back focus is too short such that the ratio exceeds the upper limit of the conditional expression (1), use in an image pickup apparatus with a quick return mirror, for example, a single-lens reflex camera, is difficult. In the case where the negative refractive power of the first lens unit L1 is too strong such that the ratio falls below the lower limit of the conditional expression (1) (the absolute value of the negative refractive power is too high), it is difficult to correct various aberrations, such as the field curvature, astigmatism and distortion. It is further favorable to set the numerical value ranges of the conditional expression (1) as follows:

$$0.70 < |f1/Sk| < 1.20 \quad (1a)$$

It is further favorable to satisfy at least one of the following conditional expressions in the zoom lens of the present invention.

It is assumed that the material of the positive lens G1p has a specific gravity SGp, and the material of the negative lens G1n has a specific gravity SGn. The specific gravity of the material is a ratio between the mass of the material at a normal temperature (15° C. to 25° C.) and the mass of pure water having the same volume at a pressure 101.325 kPa (standard pressure) at 4° C. It is further assumed that the material of the positive lens G1p has an Abbe number vp, the material of the negative lens G1n has an Abbe number vn, the positive lens G1p has a focal length fp, the negative lens G1n has a focal length fn, and the first lens unit L1 has a focal length f1.

It is further assumed that the average value of the refractive indices of the materials of lenses included in the first lens unit L1 is Nave, and the material of the negative lens G1 that has a meniscus shape and is arranged closest to the object side in the first lens unit L1 has a refractive index NG1. It is preferable to satisfy at least one of the following conditional expressions:

$$0.5 < SGp < 2.0 \quad (2)$$

$$0.5 < SGn < 2.0 \quad (3)$$

$$15.0 < vp < 40.0 \quad (4)$$

$$50.0 < vn < 75.0 \quad (5)$$

$$0.8 < |fp/fn| < 1.2 \quad (6)$$

$$1.6 < |fp/f1| < 2.5 \quad (7)$$

$$1.5 < fn/f1 < 2.5 \quad (8)$$

$$1.45 < Nave < 1.65 \quad (9)$$

$$1.45 < NG1 < 1.70 \quad (10)$$

Next, the technical meaning of each conditional expression is described. The conditional expressions (2) and (3) define the specific gravities of the resin materials of the positive lens G1p and the negative lens G1n that are made of resin materials in the first lens unit L1, respectively. In the case where the upper limit of the conditional expression (2) or (3) is exceeded, the specific gravity of the resin material is high and the first lens unit L1 is heavy in weight. In the case where the specific gravity is low with the lower limit of the conditional expression (2) or (3) being fallen below, the refractive index is too low and the first lens unit L1 becomes large in size, which is unfavorable.

The conditional expressions (4) and (5) define the Abbe numbers of the materials of the positive lens G1p made of a resin material and the negative lens G1n made of a resin material in the first lens unit L1, respectively. In the case where the upper limit of the conditional expression (4) or (5) is exceeded or the lower limit thereof is fallen below, correction of the chromatic aberration in the first lens unit L1 becomes insufficient, which increase variation in chromatic aberration during zooming and focusing.

The conditional expression (6) defines the ratio of the focal lengths of the positive lens G1p and the negative lens G1n that are made of resin materials in the first lens unit L1. In the case where the upper limit of the conditional expression (6) is exceeded or the lower limit thereof is fallen below, the difference between the refractive powers of the positive lens G1p and the negative lens G1n that are made of resin materials is large, which increases variation in focus and aberration with respect to the variation in temperature.

The conditional expression (7) defines the ratio of the focal lengths of the positive lens G1p made of a resin material in the first lens unit L1 and the first lens unit L1. In the case where the refractive power of the positive lens G1p is weak such that the ratio exceeds the upper limit of the conditional expression (7), it is difficult to correct the chromatic aberration in the first lens unit L1. In the case where the refractive power of the positive lens G1p is strong such that the ratio falls below the lower limit of the conditional expression (7), it is difficult to correct various aberrations, such as the chromatic aberration and the field curvature.

The conditional expression (8) defines the ratio of the focal lengths of the negative lens G1n made of a resin material in the first lens unit L1 and the first lens unit L1. In the case where the negative refractive power of the negative lens G1n is weak (the absolute value of the negative refractive power is small) such that the ratio exceeds the upper limit of the conditional expression (8), it is difficult to correct the field curvature and distortion in the first lens unit L1. In the case where the negative refractive power of the negative lens G1n is strong such that the ratio falls below the lower limit of the conditional expression (8), it is difficult to correct various aberrations, such as the chromatic aberration and correct variation in aberrations during variation in temperature.

The conditional expression (9) defines the average value of the refractive indices of the materials of the lenses included in the first lens unit L1. A glass material with a low specific gravity typically tends to have a low refractive index. The conditional expression (9) is to facilitate reduction in weight. In the case where the upper limit of the conditional expression (9) is exceeded, the specific gravity of lenses included in the first lens unit L1 is heavy in weight and it is difficult to reduce the weight of the first lens unit L1. In the case of a low refractive index with the lower limit of the conditional expression (9) being fallen below, it is difficult to correct the field curvature and distortion.

The conditional expression (10) defines the refractive index of the material of the negative lens G1 that has a meniscus shape and is disposed closest to the object side in the first lens unit L1. Glass materials with low specific gravities typically tend to have low refractive indices. The negative lens G1 disposed closest to the object side in the first lens unit L1 is heaviest in weight as a single item. Consequently, the degree of effect on reduction in weight is high. In the case where the upper limit of the conditional expression (10) is exceeded, the specific gravity of lenses included in the first lens unit L1 is heavy and it is difficult to reduce the weight. In the case where the lower limit of the conditional expression (10) is fallen below, the refractive index is low. Consequently, it is difficult to correct the field curvature and distortion.

In each embodiment, it is further favorable to set the numerical value ranges of the conditional expressions (2) to (10) as follows:

$$0.7 < SGp < 1.3 \quad (2a)$$

$$0.7 < SGn < 1.2 \quad (3a)$$

$$20.0 < vp < 35.0 \quad (4a)$$

$$53.0 < vn < 60.0 \quad (5a)$$

$$0.95 < |fp/fn| < 1.20 \quad (6a)$$

$$1.85 < |fp/f1| < 2.30 \quad (7a)$$

$$1.8 \le fn/f1 < 2.2 \quad (8a)$$

$$1.50 < Nave < 1.60 \quad (9a)$$

$$1.55 < NG1 < 1.65 \quad (10a)$$

The lens configuration of the each embodiment of the present invention is hereinafter described. The zoom lens of Embodiment 1 includes, from the object side to the image side: the first lens unit L1 having the negative refractive power; and the second lens unit L2 having the positive refractive power. The first lens unit L1 includes, in order from the object side to the image side: a negative lens G1 that is made of a glass material and has a meniscus shape with a convex surface being oriented toward the object side; a negative lens G2 that has a meniscus shape with a convex surface being oriented toward the object side; and a positive lens G3 that has a meniscus shape with a convex surface being oriented toward the object side. Both the lens surfaces on the object side and the image side of the negative lens G2 and the positive lens G3 have aspherical shapes.

The negative lens G2 corresponds to the negative lens G1n. The positive lens G3 corresponds to the positive lens G1p. Both the lenses G2 and G3 are made of resin materials. The second lens unit L2 includes: from the object side to the image side: a biconvex-shaped positive lens; an aperture stop SP; a biconvex-shaped positive lens, a negative lens, and a positive lens that has a meniscus shape with the convex surface being oriented toward the image side. During focusing from the infinity to a close range, the first lens unit L1 moves on the optical axis toward the object side. During zooming from the wide angle end to the telephoto end, the first lens unit L1 moves in a substantially reciprocating manner along a shape convex to the image side. The second lens unit L2 moves toward the object side.

The zoom lens of Embodiment 2 includes, from the object side to the image side: a first lens unit L1 having a negative refractive power; a second lens unit L2 having a positive refractive power; and a third lens unit L3 having a positive refractive power. The lens configuration of the first lens unit L1 is the same as that in Embodiment 1. The second lens unit L2 includes: from the object side to the image side: a biconvex-shaped positive lens; an aperture stop SP; a biconvex-shaped positive lens, and a negative lens.

The third lens unit L3 includes a positive lens that has a meniscus shape with a convex surface being oriented toward the image side. The focusing is the same as that in Embodiment 1. During zooming from the wide angle end to the telephoto end, the first lens unit L1 moves in a substantially reciprocating manner along a shape convex to the image side. The second lens unit L2 moves toward the object side. The third lens unit L3 moves toward the object side. The zoom lens of Embodiment 3 includes, from the object side to the image side: a first lens unit L1 having a negative refractive power; a second lens unit L2 having a positive refractive power; a third lens unit L3 having a negative refractive power; and a fourth lens unit having a positive refractive power. The lens configuration of the first lens unit L1 is the same as that in Embodiment 1.

The second lens unit L2 includes: from the object side to the image side: a biconvex-shaped positive lens; a negative lens with a concave surface being oriented toward the object side; a biconvex-shaped positive lens; a cemented lens that includes a biconvex-shaped positive lens and a meniscus-shaped negative lens cemented to each other; and an aperture stop SP. The third lens unit L3 includes a cemented lens that includes a negative lens with the surface on the object side having a concave shape and a biconvex-shaped positive lens that are cemented to each other. The fourth lens unit L4 includes a negative lens that is made of a resin material and has an aspherical surface with this convex surface being oriented toward the object side, and a biconvex-shaped positive lens. During focusing from the infinity to a close range, the negative lens in the second lens unit L2 moves on the optical axis toward the object side.

During zooming from the wide angle end to the telephoto end, the first lens unit L1 moves in a substantially reciprocating manner along a shape convex toward the image side. All the lens units moves toward the object side so that the interval between the second lens unit L2 and the third lens unit L3 should increase and the interval between the third lens unit L3 and the fourth lens unit L4 should decrease.

A zoom lens of Embodiment 4 is as follows, from the object side to the image side. This zoom lens includes: a first lens unit L1 having a negative refractive power; a second lens unit L2 having a positive refractive power; a third lens unit L3 having a negative refractive power; a fourth lens unit L4 having a positive refractive power; a fifth lens unit L5 having a negative refractive power; and a sixth lens unit L6 having a positive refractive power. The lens configuration of the first lens unit L1 is the same as that in Embodiment 1. The second lens unit L2 includes a biconvex-shaped positive lens. The third lens unit L3 includes a negative lens with the surface on the object side having a concave shape.

The fourth lens unit L4 includes: from the object side to the image side: a biconvex-shaped positive lens; a cemented lens that includes a biconvex-shaped positive lens and a meniscus-shaped negative lens cemented to each other; and an aperture stop SP. The fifth lens unit L5 includes a cemented lens that includes a negative lens with the concave surface being oriented toward the object side and a meniscus-shaped positive lens cemented to each other. The sixth lens unit L6 is made of resin materials, and includes a meniscus-shaped negative lens that has an aspherical surface with this convex surface being oriented toward the object side and a biconvex-shaped positive lens. During focusing from the infinity to a close range, the third lens unit L3 moves on the optical axis toward the object side.

During zooming from the wide angle end to the telephoto end, the first lens unit L1 moves in a substantially reciprocating manner along a shape convex toward the image side. The interval between the second lens unit L2 and the third lens unit L3 increases. The interval between the third lens unit L3 and the fourth lens unit L4 decreases. The interval between the fourth lens unit L4 and the fifth lens unit L5 increases. The interval between the fifth lens unit L5 and the sixth lens unit L6 decreases. All the lens units move toward the object side so as to satisfy such variation of the intervals.

FIG. 10 is a schematic diagram of a main part of a single-lens reflex camera. FIG. 10 illustrates an image pickup optical system that has the zoom lens 1 in any of Embodiments 1 to 4. The zoom lens 1 is held in a barrel 2, which is a holder member. The diagram also illustrates a camera body 20. The camera body 20 includes a quick return mirror 3, a focal plane plate 4, a penta roof prism 5; and an eyepiece 6.

The quick return mirror 3 reflects a light flux upward from the image pickup optical system 10. The focal plane plate 4 is disposed at an image-forming position of the image pickup optical system 10. The penta roof prism 5 converts an inverted image formed on the focal plane plate 4 into an erected image. An observer observes the erected image through the eyepiece 6. A solid-state image pickup element (photo-electric conversion element), such as a CCD sensor and CMOS sensor, or a silver halide film, which receives the light of image, is disposed on a photosensitive surface 7. During image taking, the quick return mirror 3 is retracted from the optical path, and an image is formed on the photosensitive surface 7 by the image pickup optical system 10.

The zoom lens of the present invention is thus applied to the image pickup apparatus, such as a single-lens reflex camera interchangeable lens. This application can achieve the image pickup apparatus that has high optical characteristics. Furthermore, the zoom lens of the present invention is applicable in an analogous manner to a mirrorless single-lens reflex camera that includes no quick return mirror. The zoom lens of the present invention is applicable not only to a digital camera, video camera and a silver halide film camera, but also to optical apparatuses, such as a telescope, binoculars, copier and projector.

The description has thus been made on exemplary embodiments of the present invention. However, the present invention is not limited to such embodiments. Various change and modification can be applied within the range of the gist of the present invention.

Specific numerical value data corresponding to Embodiments 1 to 4 are listed as follows. i indicates the order counted from the object. The surface number i is counted sequentially from the object side. The curvature radius ri, the surface interval di between the i-th and (i+1)-th surfaces are described. The refractive index ndi and the Abbe number vdi are those of a medium between the i-th and (i+1)-th surfaces for d-line. The back focus BF is also described. The total length of the zoom lens represents the distance between the first lens surface to the image plane.

The aspherical surface is represented by being assigned a symbol * after the surface number. The aspherical shape is represented as follows, assuming that X is the amount of displacement from the surface apex in the optical axis direction, h is the height from the optical axis in a direction perpendicular to the optical axis, R is the paraxial curvature radius, k is the conic constant, and A4, A6, A8, A10 and A12 . . . are aspherical surface coefficients of respective orders:

$$x=(h^2/R)/[1+\{1-(1+k)(h/R)^2\}^{1/2}]+A4\times h^4+A6\times h^6+A8\times h^8+A10\times h^{10}+A12\times h^{12}\ldots$$

"e±XX" in each aspherical surface coefficient means "$\times 10^{\pm XX}$". Numerical values related to each conditional expression is listed in Table 1.

Embodiment 1

| | | Unit mm | | | |
|---|---|---|---|---|---|
| | | Surface data | | | |
| Surface number | r | d | nd | vd | Effective diameter |
| 1 | 42.000 | 1.30 | 1.62299 | 58.2 | 32.98 |
| 2 | 13.475 | 6.80 | | | 24.86 |
| 3* | 31.714 | 2.00 | 1.52996 | 55.8 | 24.74 |
| 4* | 15.099 | 4.23 | | | 23.38 |
| 5* | 15.704 | 2.70 | 1.60700 | 27.0 | 22.45 |
| 6* | 24.593 | (Variable) | | | 21.77 |
| 7* | 14.322 | 3.42 | 1.52996 | 55.8 | 13.36 |
| 8* | −48.566 | 1.00 | | | 13.05 |
| 9 (Stop) | ∞ | 1.00 | | | 12.48 |
| 10 | 35.544 | 2.15 | 1.62299 | 58.2 | 12.00 |
| 11 | −51.641 | 0.15 | | | 11.57 |
| 12 | −828.623 | 1.00 | 1.90366 | 31.3 | 11.25 |
| 13 | 13.977 | 4.03 | | | 10.53 |
| 14 | −25.058 | 1.28 | 1.62299 | 58.2 | 10.66 |
| 15 | −15.040 | (Variable) | | | 10.83 |
| Image plane | ∞ | | | | |

-continued

Unit mm

Aspheric surface data

Third surface

K = 0.00000e+000  A4 = 5.23950e-006   A6 = 6.32236e-007
A8 = -5.71710e-009 A10 = 2.51753e-011  A12 = -4.89546e-014

Fourth surface

K = 3.20136e-001   A4 = -1.21364e-004  A6 = 2.00900e-006
A8 = -2.69475e-008 A10 = 1.63123e-010  A12 = -4.99117e-013

Fifth surface

K = 0.00000e+000   A4 = -1.56604e-004  A6 = 2.36856e-006
A8 = -3.17930e-008 A10 = 2.19801e-010  A12 = -6.01293e-013

Sixth surface

K = 0.00000e+000   A4 = -1.10814e-004  A6 = 1.91068e-006
A8 = -2.65460e-008 A10 = 1.92591e-010  A12 = -5.25703e-013

Seventh surface

K = 0.00000e+000   A4 = -2.76786e-005  A6 = -5.41984e-007
A8 = 8.50727e-009  A10 = -1.98067e-011 A12 = -1.61398e-012

Eighth surface

K = 0.00000e+000   A4 = 6.95307e-005   A6 = -1.01381e-006
A8 = 3.09429e-008  A10 = -4.95095e-010 A12 = 2.02946e-012

Various data
Zoom ratio 2.87

|  | Wide angle | Intermediate | Telephoto |
|---|---|---|---|
| Focal length | 18.61 | 36.00 | 53.35 |
| F-number | 3.63 | 5.05 | 6.48 |
| Half angle of view (degrees) | 36.28 | 20.78 | 14.36 |
| Image height | 13.66 | 13.66 | 13.66 |
| Lens total length | 99.60 | 93.62 | 102.51 |
| BF | 35.24 | 52.12 | 68.96 |
| Positive lens G1p (G3): specific gravity 1.22 | | | |
| Negative lens G1n (G2): specific gravity 1.02 | | | |
| d6 | 33.31 | 10.45 | 2.50 |
| d15 | 35.24 | 52.12 | 68.96 |

Zoom lens unit data

| Unit | Start surface | Focal length | Lens configuration length | Front principal point | Rear principal point |
|---|---|---|---|---|---|
| 1 | 1 | -30.12 | 17.03 | 1.58 | -13.07 |
| 2 | 7 | 29.23 | 14.03 | 0.05 | -12.05 |

Single lens data

| Lens | Start surface | Focal length |
|---|---|---|
| 1 | 1 | -32.41 |
| 2 | 3 | -56.75 |
| 3 | 5 | 64.20 |
| 4 | 7 | 21.27 |
| 5 | 10 | 34.12 |
| 6 | 12 | -15.20 |
| 7 | 14 | 57.55 |

Embodiment 2

Unit mm

Surface data

| Surface number | r | d | nd | vd | Effective diameter |
|---|---|---|---|---|---|
| 1 | 42.000 | 1.30 | 1.62299 | 58.2 | 33.10 |
| 2 | 13.543 | 7.40 | | | 24.97 |
| 3* | 43.153 | 2.00 | 1.52996 | 55.8 | 24.82 |
| 4* | 17.497 | 4.40 | | | 23.54 |
| 5* | 16.618 | 2.71 | 1.60700 | 27.0 | 22.46 |
| 6* | 26.497 | (Variable) | | | 21.78 |
| 7* | 14.279 | 3.70 | 1.52996 | 55.8 | 13.60 |
| 8* | -42.584 | 1.00 | | | 13.25 |
| 9 (Stop) | ∞ | 1.00 | | | 12.66 |
| 10 | 31.287 | 2.03 | 1.62299 | 58.2 | 12.09 |
| 11 | -68.393 | 0.15 | | | 11.65 |
| 12 | -837.180 | 1.00 | 1.90366 | 31.3 | 11.37 |
| 13 | 13.649 | (Variable) | | | 10.60 |
| 14 | -22.830 | 1.24 | 1.62299 | 58.2 | 10.69 |
| 15 | -14.610 | (Variable) | | | 10.87 |
| Image plane | ∞ | | | | |

Aspheric surface data

Third surface

K = 0.00000e+000   A4 = 3.53242e-006   A6 = 7.70068e-007
A8 = -7.52597e-009 A10 = 3.65060e-011  A12 = -7.33920e-014

Fourth surface

K = 7.51956e-001   A4 = -1.23018e-004  A6 = 2.24191e-006
A8 = -2.91487e-008 A10 = 1.73129e-010  A12 = -4.92234e-013

Fifth surface

K = 0.00000e+000   A4 = -1.52118e-004  A6 = 2.48449e-006
A8 = -3.12095e-008 A10 = 2.01923e-010  A12 = -5.36324e-013

Sixth surface

K = 0.00000e+000   A4 = -1.04903e-004  A6 = 1.97658e-006
A8 = -2.58047e-008 A10 = 1.74650e-010  A12 = -4.69457e-013

Seventh surface

K = 0.00000e+000   A4 = -3.24284e-005  A6 = -5.17394e-007
A8 = 1.09583e-008  A10 = -1.18572e-010 A12 = -4.60043e-013

Eighth surface

K = 0.00000e+000   A4 = 6.16518e-005   A6 = -8.87476e-007
A8 = 2.78250e-008  A10 = -4.68957e-010 A12 = 2.19213e-012

Various data
Zoom ratio 2.87

|  | Wide angle | Intermediate | Telephoto |
|---|---|---|---|
| Focal length | 18.61 | 36.00 | 53.35 |
| F-number | 3.63 | 5.04 | 6.48 |
| Half angle of view (degrees) | 36.28 | 20.78 | 14.36 |
| Image height | 13.66 | 13.66 | 13.66 |
| Lens total length | 100.98 | 94.76 | 103.50 |
| BF | 35.20 | 52.22 | 69.18 |
| Positive lens G1p (G3): specific gravity 1.22 | | | |
| Negative lens G1n (G2): specific gravity 1.02 | | | |
| d6 | 33.76 | 10.56 | 2.50 |
| d13 | 4.09 | 4.05 | 3.89 |
| d15 | 35.20 | 52.22 | 69.18 |

-continued

Unit mm

Zoom lens unit data

| Unit | Start surface | Focal length | Lens configuration length | Front principal point | Rear principal point |
|---|---|---|---|---|---|
| 1 | 1 | −30.22 | 17.81 | 1.42 | −14.13 |
| 2 | 7 | 39.69 | 8.88 | −9.47 | −12.51 |
| 3 | 14 | 61.57 | 1.24 | 2.01 | 1.29 |

Single lens data

| Lens | Start surface | Focal length |
|---|---|---|
| 1 | 1 | −32.66 |
| 2 | 3 | −57.07 |
| 3 | 5 | 66.54 |
| 4 | 7 | 20.64 |
| 5 | 10 | 34.73 |
| 6 | 12 | −14.85 |
| 7 | 14 | 61.57 |

Embodiment 3

Unit mm

Surface data

| Surface number | r | d | nd | vd | Effective diameter |
|---|---|---|---|---|---|
| 1 | 77.227 | 1.20 | 1.60311 | 60.6 | 34.71 |
| 2 | 14.538 | 7.67 | | | 26.23 |
| 3* | 57.781 | 1.80 | 1.52996 | 55.8 | 26.32 |
| 4* | 19.165 | 1.23 | | | 25.65 |
| 5* | 24.881 | 3.54 | 1.60700 | 27.0 | 25.59 |
| 6* | 79.949 | (Variable) | | | 25.07 |
| 7 | 37.457 | 2.40 | 1.48749 | 70.2 | 14.33 |
| 8 | −58.433 | 4.39 | | | 14.33 |
| 9 | −31.212 | 0.60 | 1.65844 | 50.9 | 13.80 |
| 10 | 82.442 | 2.59 | | | 13.97 |
| 11 | 39.725 | 3.09 | 1.62523 | 36.6 | 15.26 |
| 12 | −32.748 | 0.15 | | | 15.42 |
| 13 | 33.079 | 3.52 | 1.48749 | 70.2 | 15.18 |
| 14 | −25.332 | 0.60 | 1.84666 | 23.8 | 14.82 |
| 15 | −139.681 | 1.00 | | | 14.72 |
| 16 (Stop) | ∞ | (Variable) | | | 14.46 |
| 17 | −95.354 | 0.60 | 1.63980 | 34.5 | 12.43 |
| 18 | 11.175 | 3.12 | 1.68498 | 31.4 | 12.15 |
| 19 | 49.778 | (Variable) | | | 11.97 |
| 20 | 211.111 | 1.70 | 1.52996 | 55.8 | 15.25 |
| 21* | 202.405 | 0.52 | | | 15.77 |
| 22 | −350.662 | 2.11 | 1.51633 | 64.1 | 15.86 |
| 23 | −32.135 | (Variable) | | | 16.29 |
| Image plane | ∞ | | | | |

Aspheric surface data

Third surface

K = 3.13499e+000   A4 = −1.47012e−005   A6 = 5.83858e−007
A8 = −6.31280e−009   A10 = 2.60524e−011   A12 = −3.23730e−014

Fourth surface

K = 3.20136e−001   A4 = −9.21092e−005   A6 = 2.17424e−006
A8 = −3.05025e−008   A10 = 1.73686e−010   A12 = −3.75407e−013

Fifth surface

K = 0.00000e+000   A4 = −6.33227e−005   A6 = 1.80297e−006
A8 = −2.55764e−008   A10 = 1.59451e−010   A12 = −3.46621e−013

-continued

Unit mm

Sixth surface

K = 0.00000e+000   A4 = −3.23085e−005   A6 = 6.31488e−007
A8 = −1.01132e−008   A10 = 7.11828e−011   A12 = −1.57187e−013

Twenty first surface

K = 0.00000e+000   A4 = 2.78895e−005   A6 = 6.71425e−008
A8 = −8.06438e−010   A10 = 1.19632e−011   A12 = −4.70458e−014

Various data
Zoom ratio 2.87

| | Wide angle | Intermediate | Telephoto |
|---|---|---|---|
| Focal length | 18.61 | 34.00 | 53.35 |
| F-number | 3.56 | 4.54 | 5.87 |
| Half angle of view (degrees) | 36.28 | 21.89 | 14.36 |
| Image height | 13.66 | 13.66 | 13.66 |
| Lens total length | 125.65 | 114.98 | 123.54 |
| BF | 35.08 | 50.06 | 69.16 |
| Positive lens G1p (G3): specific gravity 1.22 | | | |
| Negative lens G1n (G2): specific gravity 1.02 | | | |
| d6 | 37.19 | 11.56 | 1.00 |
| d16 | 2.60 | 6.71 | 10.08 |
| d19 | 8.93 | 4.82 | 1.45 |
| d23 | 35.08 | 50.06 | 69.16 |

Zoom lens unit data

| Unit | Start surface | Focal length | Lens configuration length | Front principal point | Rear principal point |
|---|---|---|---|---|---|
| 1 | 1 | −28.55 | 15.45 | 1.38 | −11.45 |
| 2 | 7 | 30.48 | 18.35 | 8.09 | −7.92 |
| 3 | 17 | −60.54 | 3.72 | 1.76 | −0.45 |
| 4 | 20 | 69.02 | 4.33 | 2.99 | −0.04 |

Single lens data

| Lens | Start surface | Focal length |
|---|---|---|
| 1 | 1 | −29.91 |
| 2 | 3 | −55.00 |
| 3 | 5 | 58.10 |
| 4 | 7 | 47.21 |
| 5 | 9 | −34.31 |
| 6 | 11 | 29.19 |
| 7 | 13 | 30.02 |
| 8 | 14 | −36.64 |
| 9 | 17 | −15.60 |
| 10 | 18 | 20.37 |
| 11 | 20 | −9933.43 |
| 12 | 22 | 68.36 |

Embodiment 4

Unit mm

Surface data

| Surface number | r | d | nd | vd | Effective diameter |
|---|---|---|---|---|---|
| 1 | 78.630 | 1.20 | 1.60311 | 60.6 | 33.54 |
| 2 | 14.211 | 7.85 | | | 25.46 |
| 3* | 67.441 | 1.80 | 1.52996 | 55.8 | 25.54 |
| 4* | 20.164 | 1.47 | | | 25.31 |
| 5* | 31.961 | 3.56 | 1.60700 | 27.0 | 25.24 |
| 6* | 554.791 | (Variable) | | | 24.77 |
| 7 | 39.378 | 2.17 | 1.48749 | 70.2 | 13.80 |
| 8 | −68.407 | (Variable) | | | 13.91 |
| 9 | −27.462 | 0.60 | 1.65844 | 50.9 | 14.14 |

-continued

Unit mm

| | | | | | |
|---|---|---|---|---|---|
| 10 | 192.247 | (Variable) | | | 14.53 |
| 11 | 39.474 | 3.05 | 1.54115 | 48.3 | 14.98 |
| 12 | −34.003 | 0.52 | | | 15.18 |
| 13 | 32.852 | 3.40 | 1.48749 | 70.2 | 15.12 |
| 14 | −27.367 | 0.60 | 1.84666 | 23.8 | 14.86 |
| 15 | −71.484 | 1.00 | | | 14.82 |
| 16 (Stop) | ∞ | (Variable) | | | 14.50 |
| 17 | −144.634 | 0.60 | 1.63980 | 34.5 | 12.57 |
| 18 | 13.080 | 2.42 | 1.73249 | 29.3 | 12.33 |
| 19 | 38.276 | (Variable) | | | 12.12 |
| 20 | 237.247 | 1.70 | 1.52996 | 55.8 | 14.19 |
| 21* | 165.297 | 0.30 | | | 14.74 |
| 22 | 230.092 | 1.96 | 1.51633 | 64.1 | 14.82 |
| 23 | −41.805 | (Variable) | | | 15.22 |
| Image plane | ∞ | | | | |

Aspheric surface data

Third surface

K = 3.62521e−001   A4 = −1.47093e−005   A6 = 5.69429e−007
A8 = −6.52440e−009   A10 = 2.63608e−011   A12 = −3.21282e−014

Fourth surface

K = 3.20136e−001   A4 = −9.49699e−005   A6 = 2.15185e−006
A8 = −3.05065e−008   A10 = 1.73315e−010   A12 = −3.77321e−013

Fifth surface

K = 0.00000e+000   A4 = −6.25809e−005   A6 = 1.83044e−006
A8 = −2.54929e−008   A10 = 1.59705e−010   A12 = −3.50033e−013

Sixth surface

K = 0.00000e+000   A4 = −3.42857e−005   A6 = 6.55764e−007
A8 = −1.01352e−008   A10 = 7.10426e−011   A12 = −1.53571e−013

Twenty first surface

K = 0.00000e+000   A4 = 3.18801e−005   A6 = 1.14735e−007
A8 = −2.21204e−009   A10 = 3.68005e−011   A12 = −1.99680e−013

Various data
Zoom ratio 2.87

| | Wide angle | Intermediate | Telephoto |
|---|---|---|---|
| Focal length | 18.61 | 34.00 | 53.35 |
| F-number | 3.54 | 4.56 | 5.87 |
| Half angle of view (degrees) | 36.28 | 21.89 | 14.36 |
| Image height | 13.66 | 13.66 | 13.66 |
| Lens total length | 120.14 | 112.50 | 122.18 |
| BF | 35.08 | 50.24 | 69.67 |
| Positive lens G1p (G3): specific gravity 1.22 | | | |
| Negative lens G1n (G2): specific gravity 1.02 | | | |
| d6 | 33.54 | 10.75 | 1.00 |
| d8 | 4.71 | 6.18 | 6.87 |
| d10 | 2.59 | 1.12 | 0.43 |
| d16 | 2.60 | 5.71 | 8.45 |
| d19 | 7.41 | 4.30 | 1.56 |
| d23 | 35.08 | 50.24 | 69.67 |

Zoom lens unit data

| Unit | Start surface | Focal length | Lens configuration length | Front principal point | Rear principal point |
|---|---|---|---|---|---|
| 1 | 1 | −29.44 | 15.88 | 0.47 | −13.31 |
| 2 | 7 | 51.61 | 2.17 | 0.54 | −0.93 |
| 3 | 9 | −36.45 | 0.60 | 0.05 | −0.32 |
| 4 | 11 | 23.71 | 8.57 | 1.57 | −4.60 |
| 5 | 17 | −60.89 | 3.02 | 1.89 | 0.13 |
| 6 | 20 | 73.65 | 3.96 | 2.43 | −0.28 |

Single lens data

| Lens | Start surface | Focal length |
|---|---|---|
| 1 | 1 | −28.96 |
| 2 | 3 | −55.00 |
| 3 | 5 | 55.73 |
| 4 | 7 | 51.61 |
| 5 | 9 | −36.45 |
| 6 | 11 | 34.26 |
| 7 | 13 | 31.20 |
| 8 | 14 | −52.70 |
| 9 | 17 | −18.72 |
| 10 | 18 | 26.07 |
| 11 | 20 | −1036.95 |
| 12 | 22 | 68.68 |

TABLE 1

| Conditional expression | Embodiment 1 | Embodiment 2 | Embodiment 3 | Embodiment 4 |
|---|---|---|---|---|
| (1) $|f1/Sk|$ | 0.855 | 0.859 | 0.787 | 0.839 |
| (2) SGp | 1.22 | 1.22 | 1.22 | 1.22 |
| (3) SGn | 1.02 | 1.02 | 1.02 | 1.02 |
| (4) vp | 27.0 | 27.0 | 27.0 | 27.0 |
| (5) vn | 55.8 | 55.8 | 55.8 | 55.8 |
| (6) $|fp/fn|$ | 1.13 | 1.17 | 1.06 | 1.01 |
| (7) $|fp/f1|$ | 2.13 | 2.20 | 2.04 | 1.89 |
| (8) fn/f1 | 1.88 | 1.89 | 1.93 | 1.87 |
| (9) Nave | 1.587 | 1.587 | 1.580 | 1.580 |
| (10) NG1 | 1.623 | 1.623 | 1.603 | 1.603 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-158016, filed Aug. 10, 2015 which is hereby incorporated by reference herein in its entirety.

What is claimed is:

1. A zoom lens comprising, in order from an object side to an image side: a first lens unit having a negative refractive power; and a second lens unit having a positive refractive power, an interval between adjacent lens units varying during zooming,
   the first lens unit comprises at least three lenses, the first lens unit comprises a negative lens G1n that is made of a resin material and has an aspherical-shaped lens surface, and a positive lens G1p that is made of a resin material and has an aspherical-shaped lens surface,
   wherein a following conditional expression is satisfied:

$0.55<|f1/Sk|<2.20$, where f1 represents a focal length of the first lens unit, and Sk represents a back focus at a wide angle end.

2. The zoom lens according to claim 1, wherein following conditional expressions are satisfied:

$0.5<SGp<2.0$, and $0.5<SGn<2.0$, where SGp represents a specific gravity of a material of the positive lens G1p, and SGn represents a specific gravity of a material of the negative lens G1n.

3. The zoom lens according to claim 1, wherein following conditional expressions are satisfied:

$$15.0 < \nu p < 40.0, \text{ and}$$

$$50.0 < \nu n < 75.0,$$

where νp represents an Abbe number of a material of the positive lens G1p, and νn represents an Abbe number of a material of the negative lens G1n.

4. The zoom lens according to claim 1, wherein a following conditional expression is satisfied:

$$0.8 < |fp/fn| < 1.2,$$

where fp represents a focal length of the positive lens G1p, and fn represents a focal length of the negative lens G1n.

5. The zoom lens according to claim 1, wherein following conditional expressions are satisfied:

$$1.6 < |fp/f1| < 2.5, \text{ and}$$

$$1.5 \le fn/f1 < 2.5,$$

where f1 represents a focal length of the first lens unit, fp represents a focal length of the positive lens G1p, and fn represents a focal length of the negative lens G1n.

6. The zoom lens according to claim 1, wherein a following conditional expression is satisfied:

$$1.45 < Nave < 1.65,$$

where Nave represents an average value of refractive indices of materials of lenses included in the first lens unit.

7. The zoom lens according to claim 1, wherein the first lens unit comprises a meniscus-shaped negative lens G1 closest to the object side, and a following conditional expression is satisfied:

$$1.45 < NG1 < 1.70,$$

where NG1 represents a refractive index of a material of the negative lens G1.

8. The zoom lens according to claim 1, wherein on the object side of the lens that is made of the resin material and included in the first lens unit, a meniscus-shaped negative lens made of a glass material is included.

9. The zoom lens according to claim 1, wherein the first lens unit consists of, in order from the object side to the image side: a meniscus-shaped negative lens G1 made of a glass material; an negative lens G2 that is made of a resin material and has an aspherical-shaped lens surface; and a positive lens G3 that is made of a resin material and has an aspherical-shaped lens surface, and the negative lens G2 is the negative lens G1n, and the positive lens G3 is the positive lens G1p.

10. The zoom lens according to claim 1, wherein the zoom lens consists of, in order from the object side to the image side: a first lens unit having a negative refractive power; and a second lens unit having a positive refractive power.

11. The zoom lens according to claim 1, wherein the zoom lens consists of, in order from the object side to the image side: a first lens unit having a negative refractive power; a second lens unit having a positive refractive power; and a third lens unit having a positive refractive power.

12. The zoom lens according to claim 1, wherein the zoom lens consists of, in order from the object side to the image side: a first lens unit having a negative refractive power; a second lens unit having a positive refractive power; a third lens unit having a negative refractive power; and a fourth lens unit having a positive refractive power.

13. The zoom lens according to claim 1, wherein the zoom lens consists of, in order from the object side to the image side: a first lens unit having a negative refractive power; a second lens unit having a positive refractive power; a third lens unit having a negative refractive power; a fourth lens unit having a positive refractive power; a fifth lens unit having a negative refractive power; and a sixth lens unit having a positive refractive power.

14. An image pickup apparatus, comprising:
a zoom lens; and
an image pickup element configured to receive an image formed by the zoom lens,
the zoom lens comprising, in order from an object side to an image side: a first lens unit having a negative refractive power; and a second lens unit having a positive refractive power,
wherein intervals between adjacent lens units vary during zooming,
the first lens unit comprises at least three lenses, the first lens unit comprises a negative lens G1n that is made of a resin material and has an aspherical-shaped lens surface, and a positive lens G1p that is made of a resin material and has an aspherical-shaped lens surface, and a following conditional expression is satisfied:

$$0.55 < |f1/Sk| < 2.20,$$

where f1 represents a focal length of the first lens unit, and Sk represents a back focus at a wide angle end.

* * * * *